United States Patent [19]
Schrader et al.

[11] Patent Number: 6,051,632
[45] Date of Patent: Apr. 18, 2000

[54] FREE-FLOWING COMPRESSION MOLDING COMPOSITIONS AND PROCESSES FOR THEIR PRODUCTION AND USE

[75] Inventors: Lutz Schrader, Krefeld; Hanns-Peter Müller, Odenthal; Richard Kopp, Köln, all of Germany

[73] Assignee: Bayer Aktiengesellschaft, Leverkusen, Germany

[21] Appl. No.: 08/286,077

[22] Filed: Aug. 4, 1994

[30] Foreign Application Priority Data

Aug. 17, 1993 [DE] Germany .............................. 43 27 570

[51] Int. Cl.[7] ...................................................... C08L 63/00
[52] U.S. Cl. ........................... 523/440; 264/330; 525/504; 525/507; 525/523; 528/119
[58] Field of Search ............................. 523/440; 525/504, 525/507, 523; 528/119, 120; 264/330

[56] References Cited

U.S. PATENT DOCUMENTS

| | | | |
|---|---|---|---|
| 3,288,747 | 11/1966 | Sussman | 260/37 |
| 3,870,665 | 3/1975 | Diehr et al. | 524/13 |
| 4,087,414 | 5/1978 | Kamiyama et al. | 525/507 |
| 4,130,546 | 12/1978 | Goto et al. | 525/122 |
| 4,377,646 | 3/1983 | Blount | 521/156 |
| 4,699,931 | 10/1987 | Fuzesi et al. | 521/156 |
| 4,728,676 | 3/1988 | Müller et al. | 521/107 |
| 4,740,527 | 4/1988 | Von Bonin | 521/159 |
| 4,788,224 | 11/1988 | Müller et al. | 521/104 |
| 5,021,536 | 6/1991 | Müller et al. | 528/73 |
| 5,047,455 | 9/1991 | Hesse et al. | 525/28 |
| 5,109,034 | 4/1992 | Mafoti | 528/66 |
| 5,266,662 | 11/1993 | Jakob et al. | 525/528 |

FOREIGN PATENT DOCUMENTS

| | | |
|---|---|---|
| 2049855 | 1/1992 | Canada . |
| 1115922 | 10/1961 | Germany . |

OTHER PUBLICATIONS

Lee et al—"Handbook of Epoxy Resins" 1982 Reissue McGraw Hill, pp. 11–2 to 11–12.

*Primary Examiner*—Robert Dawson
*Attorney, Agent, or Firm*—Joseph C. Gil; Lyndanne M. Whalen

[57] ABSTRACT

Free-flowing compression molding compositions made up of from about 40 to about 80 wt. % of organic filler, from about 20 to about 60 wt. % of an organic reactive resin, and optionally further auxiliary substances and additives. The reactive resin contains an epoxide which may be liquid, a latent catalyst and a powdered polyisocyanate which is solid at room temperature.

9 Claims, No Drawings

FREE-FLOWING COMPRESSION MOLDING COMPOSITIONS AND PROCESSES FOR THEIR PRODUCTION AND USE

BACKGROUND OF THE INVENTION

The present invention relates to free-flowing compression molding compositions and to processes for their production and use.

Reaction mixtures of polyepoxides and polyisocyanates are attracting increasing interest as starting components for the production of high quality polyaddition plastics. Plastics with isocyanurate and oxazolidinone structures may be formed, for example, from 1,2-epoxides and a polyisocyanate using a curing catalyst. (See, e.g., German Auslegeschrift 1,115,922).

Storage-stable mixtures of reactive resins are described, for example, in EP 0,272,563 and EP 0,331,996. These disclosures are directed to storage-stable mixtures which may be used in many industrial applications to produce very high quality final products. The disclosed resins are taught to be useful as starting components for electrical insulation materials and for the production of composite materials with extremely good properties ($T_g$ 300° C., flameproofing without halogen, elevated resistance to chemicals, strength, impact strength, etc.). These prior art resins are stabilized with certain alkylating agents which inhibit the reaction between epoxide groups and isocyanate groups.

SUMMARY OF THE INVENTION

It is an object of the present invention to provide reactive compositions in free-flowing form.

It is also an object of the present invention to provide a process for the production of reactive compositions in free-flowing form.

It is a further object of the present invention to provide a process for the production of reactive compositions which are storage stable.

It is another object of the present invention to provide reactive compositions which may be used in the production of moldings, coatings, bonded articles, pressed sheet, electrical insulation and mold construction.

These and other objects which will be apparent to those skilled in the art are accomplished by mixing an inorganic filler with an epoxide, a latent catalyst and a solid, powdered polyisocyanate. These materials are mixed in amounts such that the free-flowing composition is made up of from 40 to about 80 wt % of inorganic filler and from about 20 to about 60 wt % of an organic reactive resin. The organic reactive resin is made up of an epoxide, a latent catalyst and powdered polyisocyanate. Auxiliary substances and additives may optionally be included.

DETAILED DESCRIPTION OF THE PRESENT INVENTION

It is possible to produce reactive compositions in free-flowing form in accordance with the present invention without using known stabilizers. This is extremely surprising and was not predictable by those skilled in the art because even simple physical mixtures of solid, powdered polyisocyanates with solid powdered polyepoxides are known to be subject to a "creeping" reaction during storage which causes those mixtures to become unusable after 1 to 2 months' storage.

This "creeping" reaction does not occur in the compositions of the present invention.

The present invention provides free-flowing compression molding compositions made up of from about 40 to about 80 wt. %, preferably from about 60 to about 80 wt. %, of inorganic filler and from about 20 to about 60 wt. %, preferably from about 20 to about 40 wt %, of an organic reactive resin optionally together with further auxiliary substances and additives. The reactive resin includes an epoxide which may optionally be liquid, a latent catalyst and a powdered polyisocyanate which is solid at room temperature.

The present invention also provides a process for the production of such free-flowing, highly filled compression molding compositions in which the inorganic filler is first intensively mixed ("coated") with an optionally liquid epoxide resin and a latent catalyst. In a second stage, the pulverulent mixture obtained after the first intense mixing is mixed with solid, powdered polyisocyanate.

The organic reactive resin is made up of from about 5 to about 50 parts by weight of epoxide resin, from about 0.01 to about 10 parts by weight of a (or heat activated) catalyst and from about 50 to about 95 parts by weight of a solid, powdered polyisocyanate.

The epoxide resin generally has from 2 to 4 epoxide groups per molecule and an epoxide equivalent weight of from about 90 to about 500.

The polyisocyanates useful in the practice of the present invention include those which are represented by the formula

$$Q(NCO)_n$$

in which n represents a number from 2 to 4 and

Q represents an aromatic hydrocarbon residue with from 6 to 15 carbon atoms or an arylalkyl hydrocarbon residue having from about 8 to about 15 carbon atoms.

The polyisocyanate may also be a mixture of polyisocyanate isomers and/or homologs from the diphenylmethane series.

The latent catalyst may be any of the known catalysts having an onium structure and/or a Lewis salt structure such as boron trihalide complexes of tertiary amines.

The present invention is also directed to the use of the free-flowing compression molding compositions, optionally after the addition of additional catalysts, release agents, flame retardants, dyes and other known additives such as glass fibers, carbon fibers, aramid fibers, natural fibers, cellulose fibers, chips and powders for the production of moldings, electrical insulation materials, coatings, bonded articles and laminates of all kinds.

Preferred inorganic fillers for use in the practice of the present invention include: silica flours, chalk, $Al_2O_3$, $Al(OH)_3$, synthetic silica, $SiO_2$, carbon black, SiC, corundum, metal powders, metal oxide powders.

Preferred epoxide resins (which may be liquid) include any aliphatic, cycloaliphatic, aromatic or heterocyclic compounds having at least two epoxide groups, preferably 1,2-epoxide groups. The preferred polyepoxides have from about 2 to 4, preferably about 2 epoxide groups per mole and an epoxide equivalent weight of from about 90 to about 500, preferably from about 170 to about 220.

Specific examples of suitable polyepoxides include: polyglycidyl ethers of polyhydric phenols such as pyrocatechol, resorcinol, hydroquinone, 4,4'-dihydroxydiphenylmethane, 4,4'-dihydroxy-3,3'-dimethyldiphenylmethane, 4,4'-dihydroxydiphenylmethane, 4,4'-dihydroxydiphenyl-cyclohexane, 4,4'-dihydroxy-3,3'- dimethyldiphenyl-propane, 4,4'-dihydroxydiphenyl, 4,4'-dihydroxy-diphenylsulfone, tris-(4-hydroxylphenyl)methane, the chlorination and bromination products of the above-stated diphenols, novolacs (i.e. from the reaction products of mono- or polyhydric phenols with aldehydes, in particular formaldehyde, in the presence of acid catalysts), diphenols obtained by the esterification of 2 moles of the sodium salt of an aromatic oxycarboxylic acid with one mole of a dihaloalkane or dihalodialkyl ether (See British Patent 1,017,612.) and polyphenols obtained by the condensation of phenols and long-chain haloparaffins containing at least two halogen atoms (See British Patent 1,024,288.). Other suitable polyepoxides include polyepoxide compounds based on aromatic amines and epichlorohydrin such as N-di-(2,3-epoxypropyl)aniline, N,N'-dimethyl-N,N'-diepoxypropyl-4,4'-diaminodiphenyl-methane, and N-diepoxypropyl-4-aminophenyl-glycidyl ether (See British patents 772,830 and 816,923.).

Other epoxides useful in the practice of the present invention are glycidyl esters of polybasic aromatic, aliphatic and cycloaliphatic carboxylic acids such as phthalic acid diglycidyl ester and adipic acid diglycidyl ester; glycidyl esters of the reaction products of 1 mole of an aromatic or cycloaliphatic dicarboxylic acid anhydride with ½ mole of a diol or 1/n mole of a polyol with n hydroxyl groups; and hexahydrophthalic acid diglycidyl ester which may optionally be substituted with methyl groups.

Glycidyl ethers of polyhydric alcohols such as 1,4-butanediol, 1,4-butenediol, glycerol, trimethylol-propane, pentaerythritol and polyethylene glycols may also be used. Triglycidyl isocyanurate, N,N'-diepoxypropyl-oxamide, polyglycidyl thioethers prepared from polyhydric thiols (e.g., bismercaptomethylbenzene or diglycidyltrimethylenesulfone), and polyglycidyl ethers based on hydantoins are also useful in the practice of the present invention.

The epoxidation products of polyunsaturated compounds such as vegetable oils and their transformation products; epoxidation products of di- and polyolefins, such as butadiene, vinylcyclohexene, 1,5-cyclooctadiene, and 1,5,9-cyclododecatriene; polymers and copolymers which still contain epoxidizable double bonds such as those based on polybutadiene, polyisoprene, butadiene/styrene copolymers, divinylbenzene, dicyclopentadiene, unsaturated polyesters; epoxidation products of olefins which are obtainable by Diels-Alder addition and are subsequently converted into polyepoxides, or of compounds which contain two cyclopentene or cyclohexene rings linked by bridging atoms or atomic groups may be used in the practice of the present invention. Polymers of unsaturated monoepoxides such as those prepared from methacrylic acid glycidyl ester or allyl glycidyl ether may also be used.

The following polyepoxide compounds or mixtures thereof are preferably used in the practice of the present invention: polyglycidyl ethers of polyhydric phenols, in particular of bisphenol A; polyepoxide compounds based on aromatic amines, in particular bis(N-epoxypropyl)aniline, N,N'-dimethyl-N,N'-diepoxypropyl-4,4'-diaminodiphenylmethane and N-diepoxypropyl-4-aminophenylglycidyl ether; polyglycidyl esters prepared from cycloaliphatic dicarboxylic acids, in particular hexahydrophthalic acid diglycidyl ester; polyepoxides prepared from the reaction product of n moles of hexahydrophthalic anhydride and 1 mole of a polyol with n hydroxyl groups (n=an integer from 2 to 6), in particular 3 moles of hexahydrophthalic anhydride and one mole of 1,1,1-trimethylolpropane; and 3,4-epoxycyclohexylmethane-3,4-epoxycyclohexane carboxylate.

Suitable finely divided polyisocyanates useful in the practice of the present invention are those polyisocyanates having a melting point above 25° C., preferably above 40° C. These include araliphatic, aromatic and heterocyclic polyisocyanates, polyphenyl-polymethylene polyisocyanates obtained by aniline/formaldehyde condensation and subsequent phosgenation, perchlorinated aryl polyisocyanates, polyisocyanates containing carbodiimide groups, polyisocyanates containing allophanate groups, polyisocyanates containing isocyanurate, polyisocyanates containing urethane or urea groups, polyisocyanates containing acylated urea groups, polyisocyanates containing biuret groups, polyisocyanates produced by a telomerization reaction, and polyisocyanates containing ester groups. Particularly preferred diisocyanates are those containing uretidione groups or urea groups. Specific examples of such polyisocyanates are:

| | |
|---|---|
| 4,4'-diisocyanatodiphenylmethane | m.p. 42° C. |
| p-xylylene diisocyanate | m.p. 45–46° C. |
| 1,5-diisocyanatomethylnaphthalene | m.p. 88–89° C. |
| 1,3-phenylene diisocyanate | m.p. 51° C. |
| 1,4-phenylene diisocyanate | m.p. 94–96° C. |
| 1-methylbenzene 2,5-diisocyanate | m.p. 39° C. |
| 1,3-dimethylbenzene 4,6-diisocyanate | m.p. 70–71° C. |
| 1,4-dimethylbenzene 2,5-diisocyanate | m.p. 76° C. |
| 1-nitrobenzene 2,5-diisocyanate | m.p. 59–61° C. |
| 1,4-dichlorobenzene 2,5-diisocyanate | m.p. 134–137° C. |
| 1-methoxybenzene 2,4-diisocyanate | m.p. 75° C. |
| 1-methoxybenzene 2,5-diisocyanate | m.p. 89° C. |
| 1,3-dimethoxybenzene 4,6-diisocyanate | m.p. 125° C. |
| azobenzene 4,4'-diisocyanate | m.p. 158–161° C. |
| diphenylether 4,4'-diisocyanate | m.p. 66–68° C. |
| diphenylmethane 4,4'-diisocyanate | m.p. 42° C. |
| diphenyl-dimethylmethane 4,4'-diisocyanate | m.p. 92° C. |
| naphthalene 1,5-diisocyanate | m.p. 130–132° C. |
| 3,3'-dimethylbiphenyl 4,4-diisocyanate | m.p. 68–69° C. |
| diphenyldisulfide 4,4'-diisocyanate | m.p. 58–60° C. |
| diphenylsulfone 4,4'-diisocyanate | m.p. 154° C. |
| 1-methylbenzene 2,4,6-triisocyanate | m.p. 75° C. |
| 1,3,5-trimethylbenzene 2,4,6-triisocyanate | m.p. 93° C. |
| triphenylmethane 4,4',4"-triisocyanate | m.p. 89–90° C. |
| 4,4'-diisocyanato-(1,2)-diphenylethane | m.p. 88–90° C. |
| 1-methyl-2,4-phenylene diisocyanate dimer | m.p. 156° C. |
| 1-isopropyl-2,4-phenylene diisocyanate dimer | m.p. 125° C. |
| 1-chloro-2,4-phenylene diisocyanate dimer | m.p. 177° C. |
| 2,4'-diisocyanatodiphenylsulfide dimer | m.p. 178–180° C. |
| diphenylmethane 4,4-diisocyanate dimer | |
| 3,3'-diisocyanato-4,4'-dimethyl-N,N'-diphenylurea | |
| N,N'-bis-4(4-isocyanatophenylmethyl)phenylurea and | |
| N,N'-bis-4(2-isocyanatophenylmethyl)phenylurea. | |

4,4'-Diisocyanatodiphenylmethane, 1,5-naphthalene diisocyanate, 3,3'-diisocyanato-4,4'dimethyl-N,N'-diphenylurea, dimeric 1-methyl-2,4-diisocyanatobenzene, dimeric 4,4'-diisocyanatodiphenylmethane and 3,3'-dimethyl-4,4'-diisocyanatodiphenyl are particularly preferred.

Latent catalysts which may be used in the practice of the present invention include tertiary or quaternary ammonium salts prepared from (i) organic amines and (ii) alkylating or acidic esters of organic phosphonic acids or of phosphoric acid or addition complexes of boron trihalides with tertiary amines.

Constituent (i) of the latent catalyst may be any desired mono- or polyfunctional organic amine with a secondary and/or tertiary amino group. During production of the latent catalyst, secondary amino groups may be converted by alkylation into tertiary ammonium groups, tertiary amino groups may be converted by neutralization into tertiary ammonium groups or by quaternization into quaternary ammonium groups. Suitable amines generally have a molecular weight of from about 45 to about 353, preferably from about 45 to about 185. Typical examples of suitable amines are dimethylamine, trimethylamine, diethylamine, triethylamine, di-n-butylamine, tri-n-butylamine, N,N'-dimethylethyl-ethylenediamine, N,N,N',N'-tetramethylethylenediamine, N,N-dimethylbenzylamine, triethylenediamine, dimethyloctylamine, diazabicyclooctane, methyltrioctylamine, N-methylmorpholine and bis-(N,N-dimethylaminoethyl) ether.

Constituent (ii) used to produce the latent catalyst may be an alkylating or acid ester of an organic phosphonic acid or of phosphoric acid. The preferred phosphonic acid esters are neutral, alkylating esters of organic phosphonic acids. These acid esters generally have a molecular weight of from about 124 to about 214. Examples of suitable acid esters include: methanephosphonic acid dimethyl ester, methanephosphonic acid diethyl ester, benzenephosphonic acid dimethyl ester, benzenephosphonic acid diethyl ester and ethanephosphonic acid diethyl ester.

Both monobasic acid esters and neutral esters may be used as the phosphoric acid ester to produce the latent catalyst. These esters generally have a molecular weight of from about 126 to about 268. Examples of suitable phosphoric acid esters include: dimethyl phosphate, di-n-butyl phosphate, triethyl phosphate and tri-n-butyl phosphate.

Preferred constituents (ii) of the catalysts essential to the invention are methane phosphonic acid dimethyl ester and di-n-butyl phosphate.

The catalysts used in the practice of the present invention may be produced using known processes. Such processes are described, for example, in Houben-Weyl, Volume XII/2, pages 262 et seq (1964). These catalysts may be prepared by reacting any of the above-described components (i) and (ii), preferably in equivalent quantities, with or without solvents at temperatures of from about 20 to about 200° C. It may be advantageous to perform the reaction under inert gas and/or pressure. It is also possible, for example, to use an excess of component (i) or (ii) and then optionally to remove the unreacted excess, for example by distillation.

Particularly preferred examples of catalysts which may be used in the practice of the present invention are:

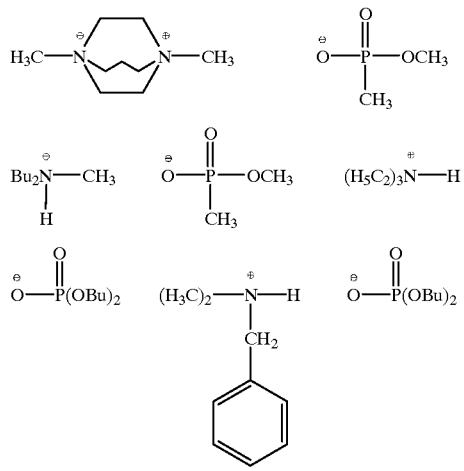

-continued

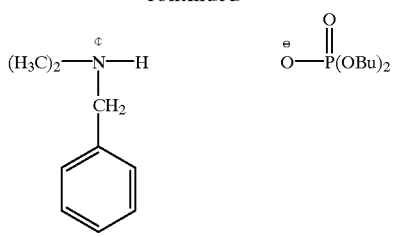

Other suitable latent catalysts include the known addition complexes of boron trihalides, in particular boron trichlorides or boron trifluorides with tertiary amines. Examples of such complexes are the addition products of boron trichloride and tertiary amines described in German patent DE 2,655,367 which are represented by the general formula $$BCl_3 \cdot NR_1R_2R_3 \tag{I}$$

in which $R_1$, $R_2$ and $R_3$ represent the same or different aliphatic, aromatic, heterocyclic or arylaliphatic residues, or in pairs may also form heterocyclic rings. The analogous complexes of boron trifluoride represented by the formula below are also suitable $$BF_3 \cdot NR_1R_2R_3, \tag{II}$$

in which $R_1$, $R_2$ and $R_3$ have the same meaning as in Formula (I).

The corresponding boron trichloride or boron trifluoride complexes of tertiary amines of the type describe above as being suitable as constituent (i) or of dimethyloctylamine or of heterocyclic tertiary amines (such as 1,2-dimethylimidazole or 1-benzyl-2-phenylimidazole) are also among the preferred catalysts.

The latent catalyst is generally used in a quantity of from about 0.01 to about 10, preferably from about 0.1 to about 10, and most preferably from about 0.5 to about 5 parts by weight for every 100 parts by weight of organic reactive resin.

The compression molding compositions of the present invention are used, optionally together with known additives and auxiliary substances, for the production of moldings with, for example, rolls, rods, pillars, sheets, profiles, coatings, bonded articles, compressed sheets, electrical insulation and for mold construction.

The following examples are intended to illustrate the invention in greater detail. All parts and percentages given in these examples are parts by weight and percentages by weight, unless otherwise indicated.

EXAMPLES

Example 1

70 parts by weight of dried synthetic silica flour which is commercially available under the name FW 600 EST were intensively mixed with a solution of 1 g of dimethyloctylamine.BCl$_3$ in 6 g of bisphenol A diglycidyl ether with moisture being excluded.

This mixture was carefully mixed with 23 g of powdered 4,4'-diphenylmethane diisocyanate and stored with moisture being excluded (mixture 1). Sheets were compression molded from this mixture at a temperature of 160° C. and a pressure of 250 bar in a mold provided with release agent and were heated to 200° C. while the pressure is maintained for 30 minutes. The sheets were demolded without any problem.

The typical mechanical properties of these molded materials were:

Impact strength: 3.5 kJ/m$^2$,
Flexural strength: 95 N/mm$^2$,
Outer fiber strain: 0.55%
Flexural modulus of elasticity: 17636 N/mm$^2$
Martens heat distortion temp.: 240° C.

These compression molding tests were repeated after the mixture had been stored at room temperature for 1, 2, 3, 4 and 8 weeks and yielded moldings with virtually identical mechanical properties.

Example 2

The procedure of Example 1 was repeated with the exception that 23 g of a liquid diphenylmethane series diisocyanate were used instead of the powdered diisocyanate. A plastically deformable composition rather than a free-flowing composition was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A free-flowing compression molding composition comprising
    a) from about 40 to about 80 wt. % of inorganic filler,
    b) from about 20 to about 60 wt. % of an organic reactive resin which contains
        (i) an epoxide,
        (ii) a latent catalyst and
        (iii) a powdered polyisocyanate
    and optionally,
    c) auxiliary substances and additives
which compression molding composition is solid at room temperature.

2. The compression molding composition of claim 1 in which the resin b) contains
    (i) from about 5 to about 50 parts by weight of epoxide resin,
    (ii) from about 0.01 to about 10 parts by weight of a heat activated catalyst and
    (iii) from about 50 to about 95 parts by weight of a solid, powdered polyisocyanate.

3. The compression molding composition of claim 2 in which the epoxide resin (i) has from 2 to 4 epoxide groups per molecule and an epoxide equivalent weight of from about 90 to about 500.

4. The compression molding composition of claim 3 in which the inorganic filler a) is selected from silica flour, chalk, Al$_2$O$_3$, SiO$_2$, metal powder metal oxide powder and combinations thereof.

5. The compression molding composition of claim 2 in which the inorganic filler a) is selected from silica flour, chalk, Al$_2$O$_3$, SiO$_2$, metal powder, metal oxide powder and combinations thereof.

6. The compression molding composition of claim 1 in which the inorganic filler a) is selected from silica flour, chalk, Al$_2$O$_3$, SiO$_2$, metal powder, metal oxide powder and combinations thereof.

7. The compression molding composition of claim 1 in which the epoxide resin (i) has from 2 to 4 epoxide groups per molecule and an epoxide equivalent weight of from about 90 to about 500.

8. A process for the production of a free-flowing compression molding composition comprising
    a) mixing an inorganic filler with an epoxide resin and a latent catalyst,
    b) mixing the mixture from a) with a solid, powdered polyisocyanate to produce a free-flowing compression molding compound made up of from about 40 to about 80 wt % inorganic filler.

9. A process for the production of molded articles comprising molding the composition of claim 1.

* * * * *